Oct. 29, 1940.                 D. BUCCICONE                 2,219,621
                               THICKNESS GAUGE
                           Filed Sept. 28, 1938
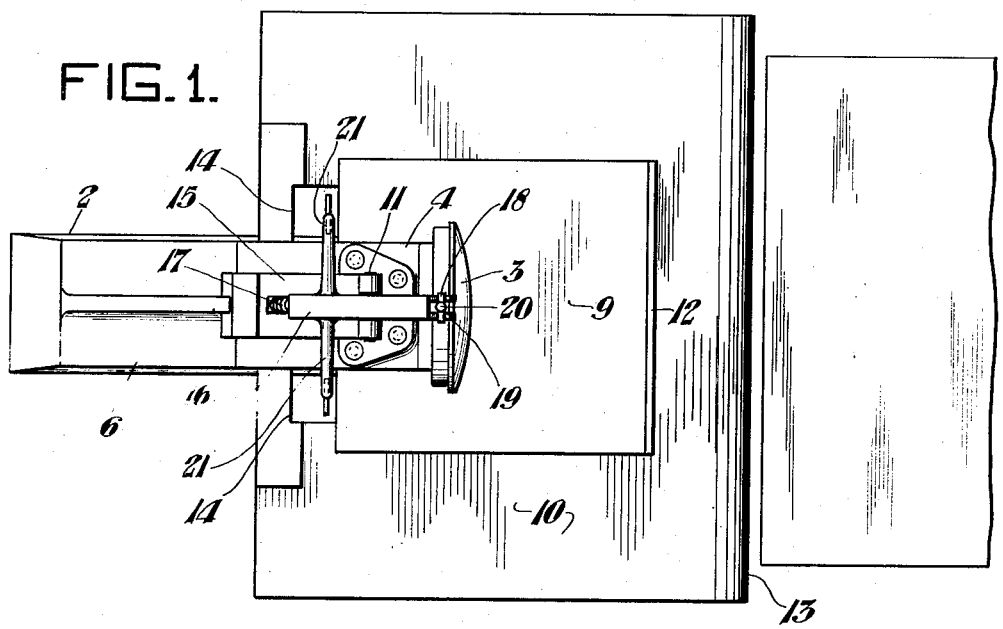
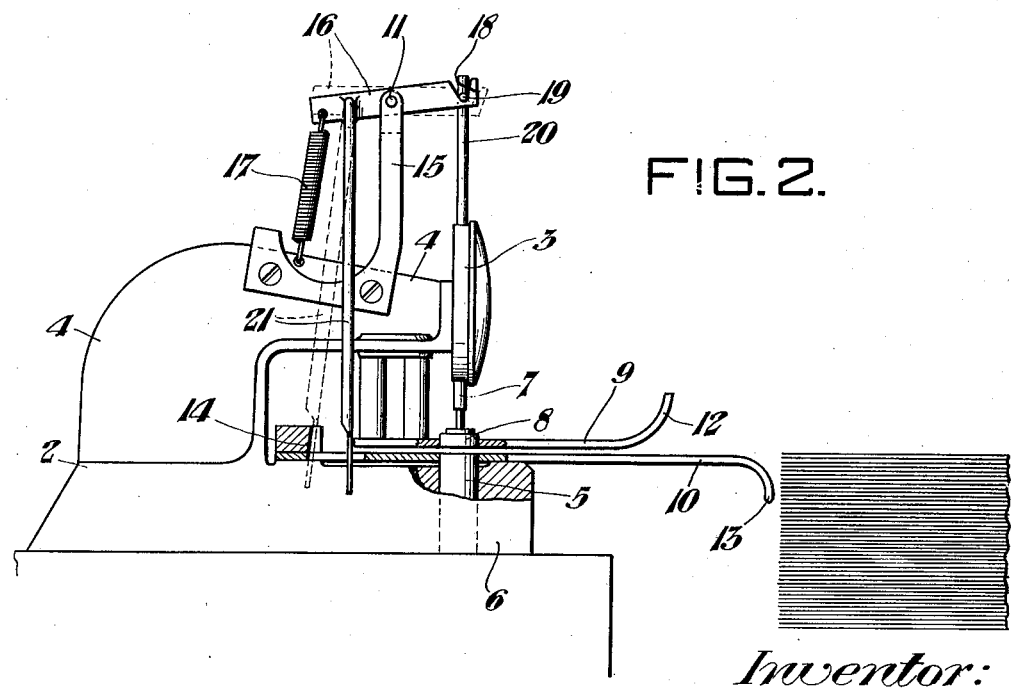
Inventor:
Dario Buccicone,
by John E Jackson
his Attorney.

Patented Oct. 29, 1940

2,219,621

UNITED STATES PATENT OFFICE 2,219,621

THICKNESS GAUGE

Dario Buccicone, Gary, Ind.

Application September 28, 1938, Serial No. 232,187

6 Claims. (Cl. 33—147)

This invention relates to gauges and, particularly, to an improved gauge for determining the thickness of material, such as sheet metal and the like.

Heretofore, a standard type gauge was usually employed for gauging the thickness of metallic sheets. Such a gauge usually consisted of a frame having a deep throat, a hard lower anvil oppositely disposed from the hardened free end of a spindle which was connected to an indicator having a spring associated therewith for normally holding the hardened free end of the spindle in contact with the hardened anvil.

When it was desired to gauge any particular sheet of metal, the sheet was forced between the two hardened surfaces, that is, the hardened free end of the spindle and the hardened anvil, forcing the spindle upwardly against the action of the spring so as to indicate on the indicator dial the thickness of the sheet. In forcing the sheet thusly in the gauge, the surfaces thereof were often scratched due to the scraping action of the hardened free end of the spindle and the hardened anvil on the opposed surfaces thereof, which was, of course, very undesirable. Also, such scraping would tend to wear the end of the spindle and the anvil, thereby necessitating frequent replacement of these parts. Furthermore, oftentimes, the gauge would become damaged when the sheets were forced therein, thereby resulting in frequent repairs to the gauge and the danger of inaccurate recordings thereby.

It is one of the objects of the present invention to provide an improved thickness gauge which is simple and inexpensive in its construction and, yet, one that will record accurate readings at all times.

It is another object of the invention to provide an improved thickness gauge which will eliminate the scratching of the surface of the material to be gauged and one in which the maintenance will be reduced to a minimum.

It is a further object of this invention to provide an improved thickness gauge which is normally inoperative but is automatically put into operation by the material to be gauged when the material is properly positioned therein.

Various other objects and advantages of this invention will be more apparent in the course of the following specification and will be particularly pointed out in the appended claims.

In the accompanying drawing, there is shown, for the purpose of illustration, one embodiment which my invention may assume in practice.

In the drawing:

Figure 1 is a plan of the improved thickness gauge of my invention; and,

Figure 2 is a side elevation thereof.

Referring more particularly to the drawing, my invention is shown incorporated with a conventional bench type thickness gauge which comprises a yoke-shaped base or frame 2 having an indicating dial 3 positioned on the upper arm 4 thereof with a hardened anvil 5 positioned directly below it on the lower arm 6 of the base. The indicating dial is of the standard type having a spindle 7 arranged therewith with a hardened anvil or portion 8 arranged on the free end thereof, just above the anvil 5 with which it is adapted to cooperate to determine the thickness of the material to be gauged. There is arranged in the indicating dial, a spring which is adapted to cooperate with the spindle 7 to force the same downwardly toward the lower anvil 5 against the surface of the material.

There preferably is also suitably arranged, on the upper arm 4, an upper guide member 9 and, on the lower arm 6, a lower guide member 10, which together are adapted to cooperate to guide the material to be gauged into the gauge. The guide members 9 and 10 are in the form of plates and extend forwardly of the base or frame 2 with the upper guide member 9 having preferably an upwardly turned portion 12 at the outer end thereof and the lower guide member 10 having a downwardly bent portion 13 on the end thereof for the purpose of aiding to guide the material to be gauged therebetween. There is also arranged rearwardly of the guide members 9 and 10, between the arms 4 and 6 of the base 2, a stop member 14 suitably arranged on the lower arm 6 against which the edge of the material to be gauged is adapted to abut when it is properly positioned in the gauge.

According to the present invention, there is suitably arranged, on the upper arm 4 of the base 2, an upwardly extending bracket 15. There is pivotally arranged at 11 on the upper end of the bracket 15 intermediate its ends, a lever 16 having one end attached to the end of a tension coil spring 17 with the other end floatingly attached to the upper end of a spindle extension 20 carried by the spindle 7 and extending up through the top of the indicating dial 3. The end of the lever is floatingly attached to the spindle extension, preferably by means of a hooked portion 18 therein which is adapted to receive a horizontally disposed pin 19 carried by the spindle extension member 20. The spring 17 has its opposite end preferably connected to the base 2 and needs to be of such strength as to overcome the action of the spring in the indicating dial. There is arranged on the lever 16 and rigidly secured thereto, preferably between the spring 17 and its pivot 11, a pair of downwardly extending arms 21 in the form of rods which are adapted to extend to a position just below the guide members 9 and 10, immediately in front of the stop 14 across the path taken by the material to be gauged as it is placed in the gauge. It is the purpose of the spring 17 to normally retain the arms 21 in front of the stop 14, as shown in the full lines of Figure 2, and to retain the spindle extension member 20 in its uppermost position, thereby raising the spindle 7 to space the anvil 8 carried thereby away from the lower anvil 5.

When it is desired to determine the thickness of any particular sheet or piece of material, the material is positioned between the members 9 and 10 and moved into the gauge until the edge thereof strikes the arms 21 and moves them rearwardly, as shown in the dotted lines of Figure 2, and the edge of the material contacts the stop 14. As the arms 21 are moved rearwardly by the edge of the material, they, in turn, move the lever 16 clockwise against the action of the spring 17, thereby permitting the spindle extension 20, together with the spindle 7, to move downwardly so as to position the hardened anvil 8, carried thereby, on top of the material to be gauged, forcing the material toward the lower anvil 5 to record the thickness thereof by the indicating dial. After the thickness of the material has been noted, the sheet is pulled outwardly from the gauge away from the stop 14, thereby permitting the arms 21 to return to their normal position, as shown in Figure 2, through the action of the spring 17 which rotates the lever 16 in a counter-clockwise direction about its pivot, raising the spindle extension 20, together with the spindle 7 and the anvil 8 carried thereby, upwardly away from the material.

In such an arrangement, it will be seen that the anvils do not bear on the opposed surfaces of the sheet, neither when the sheet is being positioned therein to be gauged nor when it is being removed therefrom after being gauged.

As a result of my invention, it will be seen that the gauge is normally in an inoperative position, but automatically becomes operative when the material to be gauged is properly positioned therein, thereby eliminating any undue attention by the operator as to the positioning of the sheet in the gauge.

While I have shown and described an embodiment of my invention, it will be understood that this embodiment is merely for the purpose of illustration and description and that various other forms may be devised within the scope of my invention, as defined in the appended claims.

I claim:

1. A gauge of the class described comprising an indicating dial, a spindle associated therewith for actuating the pointer of said dial, a stationary anvil disposed oppositely from the free end of said spindle and with which it is adapted to cooperate to gauge the thickness of the material, means for normally holding the spindle out of contact with said anvil in an inoperative position, and a material contacting means for actuating said last mentioned means, said material adapted to cooperate with said contacting means when properly positioned in under said spindle on the anvil of said gauge so as to release the spindle holding means, thereby automatically placing the dial in an operative position so that it will indicate the thickness of the material.

2. A gauge of the class described comprising an indicating dial, a spindle associated therewith for actuating the pointer of said dial, a stationary anvil disposed oppositely from the free end of said spindle and with which it is adapted to cooperate to gauge the thickness of the material, an extension arranged on the opposite end of said spindle, means associated with said extension for normally holding the spindle out of contact with said anvil in an inoperative position, and a material contacting means for actuating said last mentioned means with the edge of the material adapted to cooperate with said contacting means when properly positioned in the gauge for releasing the spindle holding means so that the free end of said spindle will rest against the material, thereby automatically placing the spindle together with the dial in an operative position so that the dial will indicate the thickness of the material.

3. A gauge of the class described comprising an indicating dial, a spindle associated therewith for actuating the pointer of said dial, a stationary anvil disposed oppositely from the free end of said spindle and with which it is adapted to cooperate to gauge the thickness of a sheet of material, an extension arranged on the opposite end of said spindle, a lever pivotally arranged intermediate its ends on said gauge, one end of said lever being connected to the free end of said extension, means connected to the opposite end of said lever for actuating the lever so as to normally retain the spindle in an inoperative position and out of contact with said anvil, and means with which the edge of the sheet to be gauged is adapted to cooperatefi when properly positioned in under the spindle on top of the anvil in said gauge for releasing the spindle so that the free end thereof will rest against the sheet, thereby automatically placing the spindle together with the dial in an operative position so that the dial will indicate the thickness of the sheet material.

4. A gauge of the class described comprising an indicating dial, a spindle associated therewith for actuating the pointer of said dial, a stationary anvil disposed oppositely from the free end of said spindle and with which it is adapted to cooperate to gauge the thickness of a sheet of material, an extension arranged on the opposite end of said spindle, a lever pivotally arranged intermediate its ends on said gauge, one end of said lever being connected to the free end of said extension, means associated with the opposite end of said lever actuating the same so as to normally retain the spindle in an inoperative position and out of contact with said anvil, and means extending from said lever to a position into the path the sheet takes as it is being placed in the gauge, whereby the edge of the sheet to be gauged when placed therein cooperates with said last mentioned means actuating said lever against the action of the retaining means so as to release said spindle and position the free end thereof against the sheet, thereby automatically placing the spindle together with the dial in an operative position so that the dial will indicate the thickness of the sheet material.

5. A gauge of the class described comprising means for indicating the thickness of the material to be gauged, means for normally holding said indicating means in an inoperative position, and a material contacting means for actuating said last mentioned means, said material adapted to cooperate with said contacting means when positioned in said gauge which releases said indicating means so as to automatically place the same in an operative position.

6. A gauge of the class described comprising an indicating dial, means for normally holding said dial in an inoperative position, and a material contacting means associated with said dial holding means for actuating the same, said material adapted to cooperate with said contacting means when positioned in said gauge which releases said dial holding means so as to automatically place the same in an operative position.

DARIO BUCCICONE.